March 19, 1963  YOSHIZO SAKAMOTO  3,082,310
FURNACE CONSTRUCTION FOR DRYING GARLIC
Filed July 24, 1959
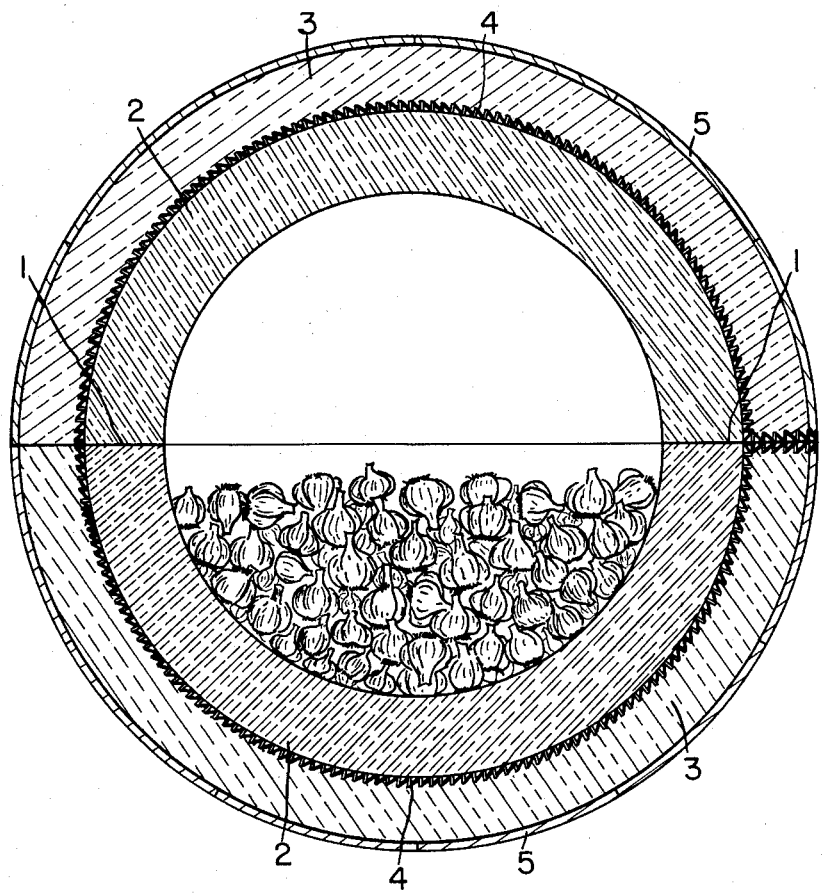
INVENTOR.
YOSHIZO SAKAMOTO

United States Patent Office 3,082,310
Patented Mar. 19, 1963

3,082,310
FURNACE CONSTRUCTION FOR DRYING GARLIC
Yoshizo Sakamoto, 1882—25 Kamekawa, Beppu City, Oita, Japan
Filed July 24, 1959, Ser. No. 829,238
4 Claims. (Cl. 219—19)

This invention relates to a process for treating garlic and to a furnace for heat treating garlic which makes it possible to manufacture very effective garlic drugs taking a maximum advantage of the medical essence of garlic.

Although the specific details of the medical and therapeutic elements of garlic drugs are now fully known to the medical world today, it has been an established fact that the medical and therapeutic effectiveness of garlic is improved and its intake becomes easier if garlic is either baked or heat-treated. Hence there have been various methods of manufacturing garlic drugs by means of baking treatment of garlic. One was to bake garlic in an unglazed earthen vessel, without employing air-tight heat preservation system, using charcoal and/or an open flame, and the other was to bake garlic on an electric heater or gas heater.

The weak point of these conventional baking processes was to lose a portion of almost every important effective element contained in garlic. Further, the drugs obtainable from the foregoing baking methods are not very well absorbed by their users, and their therapeutic power is consequently not very strong. In the process of baking according to the prior art, there is left scratches and scars on the surface of the garlic clove or ball resulting in a substantial loss of the volatile elements of the garlic. Further, proper heat preservation and an air-tight system is not present in the prior art.

The special high advantage of this invention is to heat process garlic cloves in such a manner that the thin outer covering leaves of the garlic balls are peeled off without damaging the inside surface of the garlic cloves and they are then further treated by an indirect heat under an air-tight condition resulting in reabsorption of volatiles. The temperature of the heat employed here in this invention is comparatively low. The garlic cloves are heated indirectly just prior to such a point where they become carbonized by half. By doing so, it has become, for the first time, possible to make a garlic drug which has a genuinely high therapeutic and nutritions value. It goes without saying that such a drug is most liable to be absorbed by users.

The accompanying drawing shows a sectional diagram of the heat processing furnace for the raw garlic. It also indicates one of the examples of the processing methods of this invention.

After drying ripe garlic cloves, the outer thin leaves covering the garlic cloves are peeled off without leaving any damage and scars on the surface of the garlic cloves. The cloves are placed in a glazed earthen vessel, and the earthen vessel is then completely coated with artificial special clay so that the vessel is kept air-tight. The clay which is used for this purpose is made of high quality clay, fine sand, straw ash and lime. Then, dry the coating clay, preventing it from becoming cracked. Put this earthen vessel, which is air-tight and heat preserving, in an electric furnace and heat it for about 12 hours at such a comparatively low temperature as 300° C. or below. (Such temperature is to be kept inside the furnace.) The garlic cloves are heat-treated in such a way until they are just about to be carbonized.

After cooling off the garlics are taken out of the vessel and are pulverized. As this invention makes possible the heat-processing of garlic without damaging or leaving scars on the surface of the garlic cloves, it can avoid very effectively the oxidization and disintegration of valuable elements contained in garlic. Further, the invention prevents the odor or volatile elements of garlic from being lost in the process of heating, and it also converts all the volatile elements into medically effective ones. The garlic cloves are heat-treated with about 300° C. temperature or below for 12 hours in an air-tight and heat preserving furnace makes it possible to prevent the effective elements of the garlic from being oxidized and disintegrated. Thus, garlic drug obtainable from the above process is far higher in its absorption by the users when compared with such garlic drugs which are made by conventional methods. The medical and therapeutic effectiveness of the garlic drugs made by the new process is therefore enhanced, and, at the same time, it is far easier for the users to intake them because they are free from the disgusting odor peculiar to garlic. The newly processed garlic drug is, in every respect, superior to the drugs conventionally processed.

In order to get the best obtainable effect out of the aforesaid invention, a stone furnace such as mentioned below will be used:

Two pieces of hollow stone constituting a furnace are provided having an identical width. The surface of the furnace is evenly covered with heat preserving material. Between the surface and the heat preserving material, a network of electric heating wire is stretched over the surface. These two pieces of hollow stones are made to form a ball-shape furnace which is air-tight.

A number of raw garlic cloves are placed in the stone furnace and the air inside the furnace is replaced by inactive gas and the furnace is held tight in a metallic holder which is also ball-shaped. While the furnace is heated, it is rotated and vibrated. With the start of heating, the volatile material of the garlic begins to volatilize itself inside the furnace, the rotation and vibration of the furnace prevent the garlic from being over heated and causes all the garlic to be evenly heated up to about 250° C.

Even after heating is switched off, the heat preserving material keeps the inside temperature of the furnaces so high for a long time that in combination with the rotation and vibration of the furnace, the volatile material which is kept inside the furnace and which has become volatized is easily adsorbed evenly by the heat-processed garlic.

After the furnace has become cooled, it is opened and the processed garlics are taken out to be made into either powder or tablet type medicine which serves as nutrition and vitality agents.

The heating process of raw garlic employed in the aforementioned invention wherein raw garlic is heated for a long time at a comparatively low temperature in an air-tight and heat preserved stone furnace is far superior to the conventional way of baking garlic, because the present invention is more effective than the conventional ones in converting the component elements of garlic into medical compounds and drugs thus obtained are more nutritious and powerful in their therapeutic effectiveness.

Further, it must also be pointed out that the volatile materials contained in the raw garlics is well re-absorbed and recovered to the finished product because the garlics are treated in an air-tight furnace. The last, but not least important is that the rotation and vibration of the furnace keeps the excessive carbonization, the decomposition and other unfavorable influence of raw garlics due to local overheating, to the absolutely minimum extent when the furnace is heat-treated and then makes the adsorption of the volatile ingredients by the processed garlic very satisfactory at the time of cooling off of the furnace. It is not necessary to recall that with the conventional processing of garlics, there has been great loss of garlic due to excessive carbonization and disintegration and moreover loss of the volatile ingredients of garlics.

Such an undesirable effect as oxidation is controlled thanks to the use of inactive gas such as carbon dioxide and nitrogen etc. The use of Dry Ice as a source of carbon dioxide gas makes the handling and operation of this invention so easy. Examples of operation of this invention are hereunder given:

Example 1

Ripe garlic cloves are first dried, then the coverings are peeled off. In peeling off, caution must be exerted so that the surface of the inner garlic is kept safely from scars and damage. Then these peeled garlics are placed in an earthen vessel which is glazed. The vessel is then covered completely to 15 mm. thickness with a special kind of clay which is made of very fine sand, straw-ash ant lime. The quality of clay used must be the very best.

After the layer of clay has been dried, the earthen-vessel is placed into an electric furnace which is heated so that the inside temperature of the furnace is kept at about 300° C. The furnace is to be heated for about 12 hours, after the heating is over, the furnace is to be kept as it is for cooling off. Then the garlics which are heat processed and more or less in a half glazed condition, are pulverized.

Example 2

Reference is made to the accompanying drawings attached hereto, 2, 2 show two pieces of hemispherically shaped hollow stones which are to form a ball shaped furnace, their joining surface is indicated as 1. After the two are joined, inside air-tightness of the furnace must be well maintained. Each one of the stone pieces weights about 16 kgs. respectively. The thickness of the stone sides must be very even. The outer surface of the two stone pieces are covered with either glass fibre or asbestos materials 3 for heat preservation, and in between 2 and 3, nickel-chrome alloy wire is evenly housed all over.

Raw garlic cloves or balls are placed in the stone furnace so that they fill about 40% capacity of the furnace, then the inside air is replaced by carbon dioxide gas. Then the stone furnace is held tight by the metal frame 5, and the joining surface of the furnace 1 is also held very tight. Then the nickel-chrome alloy wire 4 is electrically heated while the stone furnace is given vibration and rotation either by hand or mechanically. Thus, the raw garlic cloves are gradually heated in the furnace whose inside temperature is kept at its peak at about 250° C.

Even after the electricity for heating is switched off, the rotation and vibration are still kept going on so that the cooling off of the furnace is gradual. After the temperature of the surface has come down to the normal level, the furnace is opened. The garlic cloves are then taken out of the furnace and are either pulverized or made into tablets.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A ball-shaped furnace for treating garlic comprising a pair of complementary hemispherical shaped hollow stones, a heating wire network disposed about said stones, a layer of heat preserving material surrounding said heating wire network, and a ball-shaped metal frame disposed about said heat preserving material for holding said stones in an air-tight relationship.

2. The furnace according to claim 1, wherein the space enclosed by said stones is filled with an atmosphere of carbon dioxide.

3. The furnace of claim 1 wherein said heat preserving material is asbestos.

4. The furnace of claim 1, wherein said heat preserving material is glass fibre.

References Cited in the file of this patent

UNITED STATES PATENTS

| | | |
|---|---|---|
| 176,376 | Story | Apr. 18, 1876 |
| 202,801 | Falk | Apr. 23, 1878 |
| 216,148 | Brunton | June 3, 1879 |
| 274,014 | Michells | Mar. 13, 1883 |
| 1,577,709 | Glessner | Mar. 23, 1926 |
| 2,231,506 | Morey | Feb. 11, 1941 |
| 2,490,161 | Pomph | Dec. 6, 1949 |
| 2,823,292 | Kunzle | Feb. 11, 1958 |
| 2,831,909 | Seifert | Apr. 22, 1958 |